Nov. 30, 1948.  K. B. TWOMEY  2,454,899
AID TO ART PRACTICE AND INSTRUCTION
Filed Aug. 1, 1945  2 Sheets-Sheet 1
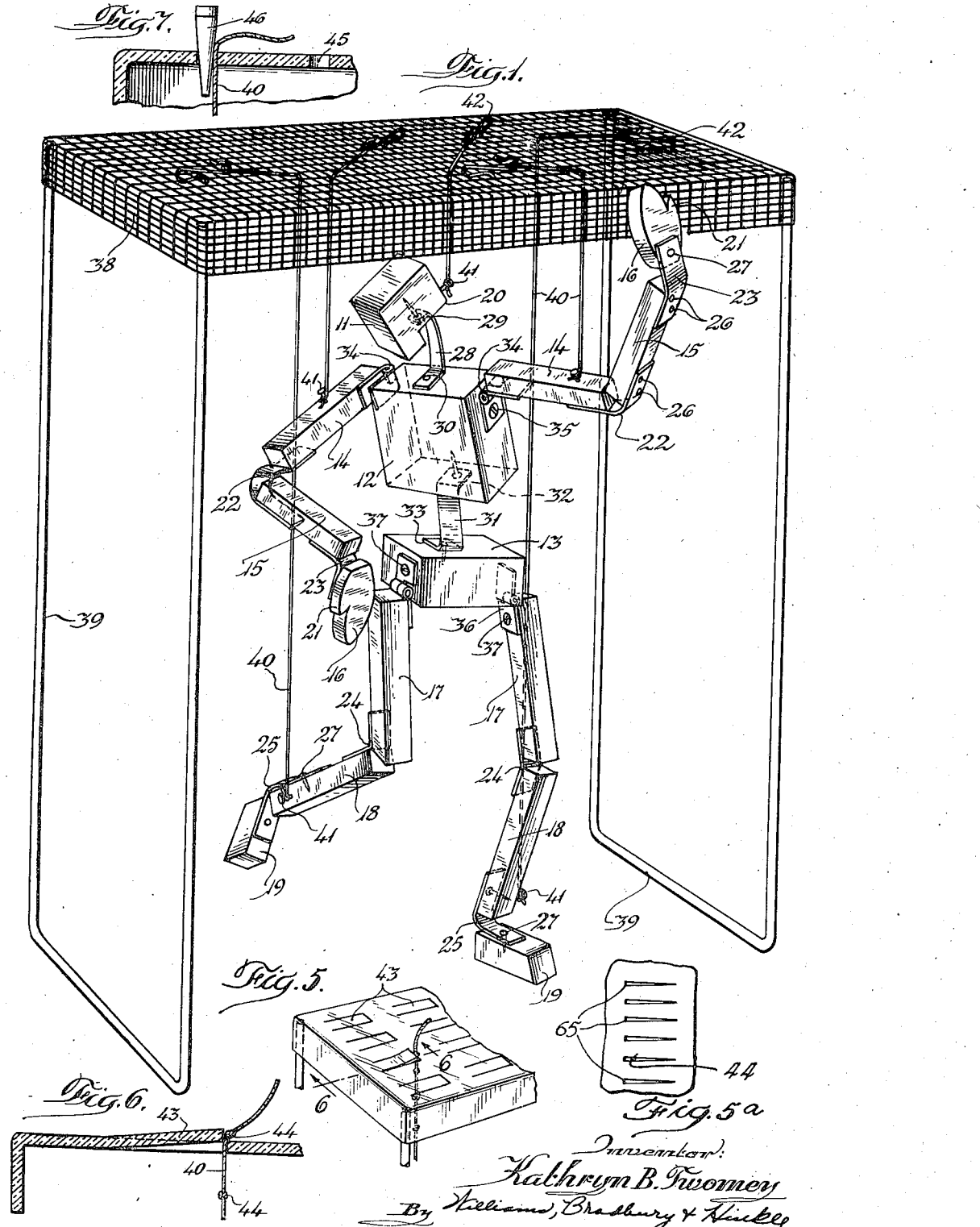

Nov. 30, 1948.　　　　　K. B. TWOMEY　　　　　2,454,899
AID TO ART PRACTICE AND INSTRUCTION
Filed Aug. 1, 1945　　　　　　　　　　　　　2 Sheets-Sheet 2
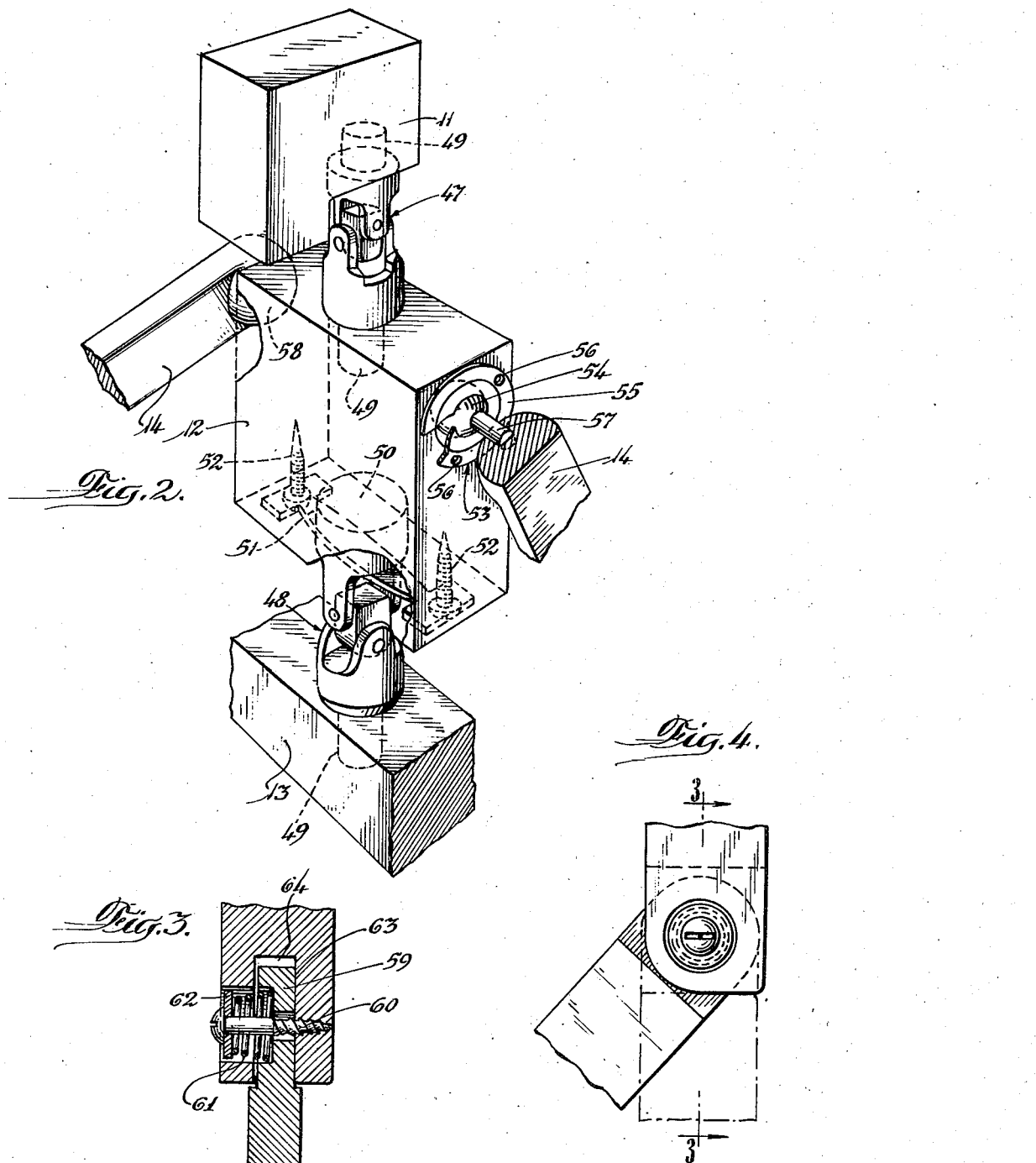

Patented Nov. 30, 1948

2,454,899

UNITED STATES PATENT OFFICE 2,454,899

AID TO ART PRACTICE AND INSTRUCTION

Kathryn B. Twomey, Chicago, Ill.

Application August 1, 1945, Serial No. 608,147

5 Claims. (Cl. 35—28)

The present invention relates to apparatus or means adapted to facilitate the grounding of art students in the foundation framework of living models. More specifically, my invention relates to an uncarved or unsculptured poseable block model of a vertebrate skeleton which may be used as a starting point for instruction and practice in drawing, as well as an aid in the development of ability to draw action poses of living models.

In teaching drawing to beginners, for example, grade-school pupils, two sharply distinct methods of instruction have been employed. The first method, which has had much vogue in recent years, emphasizes the exercise of individual creative imagination, but involves relatively little attention to the techniques of perspective, proportion, or adherence to natural forms. The result too often is that a pupil, who has been encouraged to give full rein to the putting on paper of compositions that exist only in his mind's eye, suddenly become critical, and later discouraged, about his work because it shows too great a disregard of the realities of form, proportion, and so on.

The second method of instruction in drawing consists of the substantially slavish copying of some static object, often itself a drawing, by each member of the class. Here the emphasis is on fidelity of reproduction of the object being copied; and there is neither stimulus nor opportunity for the individual pupil to exercise any creative impulse that he may have.

A principal object of my invention is to provide means for instruction in drawing, which permits of striking a suitable balance between the two foregoing methods, namely, between the first method of teaching so called creative art, but with little or no reference to techniques, and the second method of instruction with its emphasis on techniques, but with its lack of stimulus to creative endeavor.

Another principal object of my invention is to provide a simplified, uncarved or unsculptured, poseable model, made up of movably articulated members, each member being of simple geometric form; the model, when posed, being adapted to be sketched so as to yield a preliminary, skeleton outline of the eventual finished composition.

Another object of my invention is to provide an apparatus, as an aid to art practice and instruction, comprising, in combination, an unsculptured, poseable block model and means for supporting the same in any of a plurality of poses, so that substantially unobstructed views of the posed model may be obtained.

Another object is to provide a simple apparatus for use in the teaching and practice of freehand drawing, which can be produced not only at much lower cost than earlier devices that have been used as drawing aids, but also at a cost sufficiently low so as to permit of its use in home work and as a stimulus to extra-curricular art work.

A further object of my invention is to provide a skeletonoid, poseable block figure which may be placed in proximity to a living model, and fixed in the same pose as that assumed by the model, so as to furnish (a) an aid to the student or artist in analyzing the model's pose, and (b) an aid to the model in resuming the same pose after a rest period.

A further object is to provide an unsculptured, schematic block model of a vertebrate skeleton that is readily fixed in substantially every natural position that may be assumed by the type of living form for which the skeleton furnishes bony support.

Other objects, uses, and advantages of my invention will appear as the description thereof proceeds.

I am aware that, as far back as the time of Michelangelo, it was common for artists to make preliminary sketches, called cartoons, in which the major structural elements of the figures were drawn as blocks. Today such block outlining of a figure is recognized by art authorities as the best method of making the preliminary sketch; and various types of drawings in block outline are to be found as illustrations in textbooks on art and art anatomy. The difficulty, however, that is encountered by a student who attempts to apply the instructions that ordinarily accompany such block-outline illustrations, is that he is expected to visualize simple geometric outlines in a complex figure. But to translate the innumerable and subtly related planes and curved surfaces of the living model into the few, clearly related planes of a simple block, calls either for considerable earlier training or for unusually acute perception and imagination.

I am aware also that, prior to my present invention, poseable models of the human body have been used as aids in art work. Not only, however, have representative examples of such models been very expensive, but they also have been made up, commonly of carved wood, to represent the living human body; thus differing fundamentally from my novel skeletonoid model made up of uncarved or unsculptured blocks of simple geometric design.

The use of my simplified block model facilitates progress in drawing ability because it is based upon a normal and natural evolution from the simple to the complex. Aided by my model, a child who has been taught to draw a cubical, or similar rectangular, block in perspective, can achieve drawings exhibiting three-quarter views, foreshortening and natural movements—characteristics of drawings which hitherto have been associated with advanced art training and usually with adult artists.

I have coined the word "skeletonoid" for use in the description and claims herein to mean skeleton-like, or having the general form of, or resembling, a vertebrate skeleton. My employment herein of the terms "uncarved," "unsculptured," and "of simple geometric form," with reference to the block elements of my poseable model, characterizes blocks of simple shapes such as those which, if made of wood, may be formed by a lathe or saw, without the use of any of the special tools commonly employed by the carver or sculptor.

I attain the objects of my invention by apparatus illustrated in the accompanying drawing, in which:

Fig. 1 is a general view, in perspective, of my block model in posed attitude, and of means for supporting the model in a selected pose;

Fig. 2 is a detailed view, in perspective, of a portion of the block model showing variants of means for articulating the blocks to form a poseable unit;

Fig. 3 is a vertical section of a jointed portion of the model, on the line 3—3 of Fig. 4;

Fig. 4 is a lateral view of a jointed portion of the model;

Fig. 5 is a detail view, in perspective, of a variant of supporting means for the block model;

Fig. 5a shows the detail of a portion of the bottom of a variant form of tray;

Fig. 6 is a vertical section on the line 6—6 of Fig. 5; and

Fig. 7 is a detailed vertical section of another variant of the supporting means.

Like numerals refer to similar parts throughout the several views.

The model shown in Fig. 1 comprises a plurality of blocks of simple geometric form, each block representing a recognized subdivision of a human skeleton. The skeletal subdivisions and the blocks representing the same, respectively, are: The skull 11, the bony-cartilaginous thoracic cage or thorax 12, the pelvis 13, the humerus of each upper arm 14, 14, the combined bones (radius and ulna) of each forearm 15, 15, the combined bones (carpal, metacarpal, and phalangeal) of each hand 16, 16, the femur of each thigh 17, 17, the combined bones (tibia and fibula) of each leg 18, 18, and the combined bones (tarsal, metatarsal, and phalangeal) of each foot 19, 19.

All of the blocks making up the model shown in Fig. 1, except the skull 11, hands 16, 16, and feet 19, 19, are substantially rectangular parallelepipeds. The skull 11 is bounded by rectangles on all except its lateral aspects; the latter consisting of two substantially parallel, six sided, rectangular polygons. The portion of the skull 11 below a horizontal plane through its base 20 represents its mandibular portion or the lower jaw.

Each hand 16 is a frustum of an ellipsoid indented on its lateral aspect to outline the thumb 21.

Each foot 19 is bounded by rectangles except laterally by two substantially parallel trapezoids.

The blocks used to form my skeletonoid model may be made of any suitable material, such as wood, pressed wood, and similar wood compositions, with or without resin binders, synthetic resins, cast aluminum, and the like.

In order that the relative proportions of the blocks of my poseable model may be observed and embodied in a sketch with suitable accuracy by each member of a large class of pupils without resort to direct measurement, I preferably employ dimensions that bear simple fractional relations to the height of the model, or that are the same as, or easily obtained multiples or fractions of, a unit dimension laid out freehand by each pupil on a small piece of paper in a manner known to instructors of art.

I preferably employ as such unit dimension, one-eighteenth of the height of my block model. The following are the preferred dimensions of the several members thereof, expressed in terms of the foregoing unit:

Skull 11—vertical height at front, 2¼ units; vertical height at the back (occiput), 1½ units; lateral and fronto-occipital (front-to-back) dimensions, each 1½ units;

Thorax 12—height and width, 3 units each; antero-posterior (front-to back) dimension, 1½ units;

Pelvis 13—height and antero-posterior dimension, each 1½ units; width, 3 units;

Upper arm 14 and forearm 15—length, 3 units; width ½ unit,

Hand 16—length, 2 units;

Thigh 17—length, 4½ units; width, ½ unit;

Leg 18—length, 3½ units; width, ½ unit;

Foot 19—length (at sole), 2¼ units; width, ½ unit;

Cervical articulation 28, 47 and lumbar articulation 31, 48—height, each, 1½ units.

Continuing with the elements disclosed in Fig. 1: The means for movably articulating selected blocks to form joints representing the elbow joints 22, 22, the wrist joints 23, 23, the knee joints 24, 24, and the ankle joints 25, 25, preferably consist of flat strips of flexible metal, or a suitable substitute therefor, possessing sufficient stiffness so that a predetermined flexion or extension at the joint may be effected, and the postural relation of the blocks articulated thereby may be maintained without further attention. The strips may be fixed to the blocks by screws 26, 26, or by similar fastening means.

Where the capacity for swiveling of one block in relation to another is desired, a joint-forming strip may be fastened to a given block by a single screw 27.

The cervical vertebrae, or means for articulating the skull to the thorax, are represented in Fig. 1 by the flexible strip 28, which may be of the same material and possess the same characteristics as those heretofore recited for the joint strips 22, 23, 24, 25. The cervical articulation 28 is bent substantially at right angles near each end thereof to form ears 29, 30. One ear 29 is fixed to the under side of the skull 11 by a single screw, or other fastening means, so as to permit of sidewise swiveling of the skull 11 without torsion of the strip 28. The second ear 30 of strip 28 is fixed to the top surface of the thorax 12 in like manner and for the same function as the ear fastened to the skull.

The lumbar vertebrae, or means for articulating the thorax to the pelvis, are represented by the flexible strip 31 which, like strip 28, is bent substantially at right angles near each end to form ears 32, 33. Ear 32 and ear 33 are fastened, respectively, to the under side of the thorax 12 and to the upper surface of the pelvis 13 in a manner to permit of sidewise movement of thorax 12 or pelvis 13 without torsion of the strip 31.

The shoulder joints, or means for articulating the upper arm bones 14, 14 to the thorax 12, are represented by hinges 34, 34. Each half hinge is fastened to its respective block by a single screw 35 in a manner to permit of swiveling the hinge so that the upper arm bone 14 may be posed in substantially any position in which the living person may place his upper arm.

In like fashion, the hip joints, or means for articulating the thigh bones 17, 17 to the sides of the pelvis 13, are represented by hinges 36, 36; the halves thereof being fastened to their respective blocks by single screws 37, 37 in a manner to permit of swiveling each hinge so that the thigh bone 17 attached thereto may be posed in substantially any position possible for a living person.

If preferred, hinges of suitable size may be substituted for any one or more of the flat strips representing joints 22, 23, 24 and 25.

Means for supporting the block model in a given pose are shown in Fig. 1. At a suitable distance above the block model an inverted, shallow tray 38, of wire mesh, is removably mounted on U-shaped standards 39, 39. The latter are formed preferably of metal or plastic tubing; and their open ends are engaged by pins fastened to, and extending slightly beyond, the rim of the tray. I ordinarily designate the overhead support 38 as a tray because it may be used as a container for conveniently holding the block model, the separated standards 39, 39, and other accessories of my novel apparatus when the latter is not in use.

The positioning of the model in a selected pose is effected by fastening one or more strings 40, 40 to selected blocks with the aid of tacks 41, 41, or other suitable fastening means. Instead, the lower end of each string may be looped around a block and fastened in place by a bit of adhesive tape. The opposite ends of the strings are attached to hooks 42, 42, which are adapted to pass through the openings in the wire mesh. Each string is pulled through the wire mesh until the attached block is suitably positioned; then its hook is caught over a convenient strand of the wire mesh.

My use of the term "string" in the singular or plural herein comprehends any filament, ribbon or the like, of fibrous, metallic or plastic material, that has sufficient flexibility and tensile strength to perform the functions of strings 40, 40 described herein.

Another form of the tray 38 of Fig. 1, illustrated in Fig. 5, may be made of any material which is suitably rigid as a tray bottom, but which is somewhat resilient in narrow strips. Such a tray is slit in a manner to form a plurality of tongues 43, 43. In using the tray of Fig. 5, as an overhead support for the block model, the hooks 42, 42, attached to the ends of the strings 40, 40, may be dispensed with.

As shown in Fig. 6, a tongue 43 may be sprung slightly upward to form an aperture for the passage of a string 40 which has been previously attached to the block model at a predetermined point. When the string 40 has been brought past the tongue 43 (Fig. 6) the desired amount, the string is pinched by permitting the tongue to return to its unsprung position. If need be, retaining knots 44, 44 may be formed at suitable distances along the string 40.

Instead of the tongues 43, 43, formed in the tray of Fig. 5, narrow, V-shaped slots 65, 65, may be formed therein as shown in Fig. 5a; the widest part of each V being adapted to permit ready passage of a plain or knotted string 40 therethrough. The string may then be removably fastened to the tray by being wedged into a narrow portion of the V-slot, or by supporting a knot 44 on top thereof.

Still another form of string-retaining means is shown in Fig. 7. A plurality of holes 45 is formed in a tray of the general form of that shown in Fig. 5, but without the tongues 43, 43. An unknotted string 40, suitably attached at its lower end to the block model, may be passed through a hole 45 and secured therein at a predetermined point by insertion of a tapered plug 46.

The examples of trays described in the two paragraphs last above may be formed, each at a single operation, by injection or pressure molding of a suitable plastic resin.

If desired, the cervical vertebrae, or means for articulating the skull 11 to the thorax 12, may be represented by a universal joint 47 (Fig. 2) of known construction. Similarly, the lumbar vertebrae, or means for articulating the thorax 12 to the pelvis 13, may be represented by a like form universal joint 48. The universal joints 47, 48 may be fastened to their associated blocks by means of friction studs 49, 49 to permit rotation of the blocks thereabout.

A circular hole may be bored in a block to a depth sufficient to receive the cylindrical end 50—shown as the upper end of the universal joint 48—so that a metal plate 51 may be passed through the universal joint and fastened to the block by screws 52, 52, to effect a rigid connection of the universal joint to the block; the opposite end of the universal joint 48 forming the friction stud 49, as aforementioned.

Instead of the hinges 34, 34, of Fig. 1, representing the shoulder joints, those articulations may be represented by a swivel joint 53 (Fig. 2) comprising a spherical member 54 held in a substantially hemispherical depression in the block 12 (thorax) by means of a resilient, centrally perforated, circular flange 55; the latter being fastened to the block by screws 56, 56. The spherical member 54 is attached to the upper arm 14 by the pin 57. The retention of a posed position of the joint 53 may be effected by adjusting the pressure of flange 55 on the spherical member 54 through the setting of the screws 56, 56.

To facilitate movements of the upper arm 14 simulating natural rotation thereof at the shoulder joint, the upper end of the upper arm 14 may be given a substantially hemispherical rounding 58.

If desired, the swivel joint 53 may be substituted (a) for the hinges 36, 36, representing the hip joints in Fig. 1, (b) for the cervical articulation 28 or the lumbar articulation 31 of Fig. 1, and (c) for the universal joints 47 and 48 of Fig. 2.

The elbow joints 22, 22, wrist joints 23, 23, knee joints 24, 24, and ankle joints 25, 25, may, if desired, be formed in tongue-and-groove fashion, as shown, in lateral view, in Fig. 4, and in vertical section in Fig. 3.

Means for fixing such a hinge (tongue-and-groove) joint in a selected position or pose are shown in Fig. 3, wherein the tongue 59 may be rotated around the screw 60 and the coiled spring 61 when the screw 60 is loosened sufficiently so that the spring 61 does not press against the bottom of a circular depression in the tongue 59 that houses the lower portion of the spring 61. When the selected posture of the hinge joint has been effected, the posture may be fixed for as long as required by turning the screw 60 down upon the washer 62 and the spring 61 until the tension of the spring suffices to force the tongue 59 tightly against the wall 63 of the groove 64.

In using my novel block model as an aid to instruction in freehand drawing to a group of pupils, I ordinarily proceed as follows:

First, I support or otherwise position the block model in a given pose. I then ask the pupils to outline the blocks of the model on paper with chalk. After the pupils have done this I inquire of different members of the group what subject the pose suggests to each. After each pupil decides on what his finished composition is to be, he then rounds out his block sketch. In carrying out this step he is urged to preserve the feeling or mood that he has caught in the positioning of the blocks of the posed model. At this point of each pupil's composition the block model has achieved its essential object, namely, to enable the pupil to put down on paper the framework of his composition which embodies at the same time the desired accuracy in perspective and in proportion of parts. From then on the finishing of the drawing depends largely upon the industry, imagination, and artistic feeling and talent of each individual. The background and color scheme may comprise whatever each pupil elects.

The use of my block model can serve as an aid in the teaching not only of drawing but, additionally, of art appreciation and familiarity with masterpieces of art. One or more of the block models may be posed in the same manner as in a selected work of art. After the posed model or group has been drawn by the class, a reproduction of the original painting or sculpture is then shown to the pupils.

The pelvis normally changes in position when the weight of the body is shifted from one leg to the other. This illustrates a fundamental characteristic of most natural movements, namely, the effect that a change in position of one part of the body has upon other parts.

My block model is readily adapted to demonstrate such effects. Furthermore, it may be employed, in teaching the history of art, to illustrate the fundamental differences between (1) archaic art, for example an ancient Egyptian figure drawing (where parts of the body are conceived as operating separately and without affecting one another), (2) classical art (where the parts are shown as affecting one another, but their movement is principally to the left and right), and (3) baroque art (where the parts appear in unrestrained and difficultly analyzable poses). Thus, by starting instruction with my block model in unforeshortened attitudes, and then passing on to more complicated poses, the pupil can be taught to perceive that the evolution in his own work recapitulates the successive periods in the history of art.

The uses and advantages of my block model are not confined to instruction in art. It also affords valuable aid in professional art practice. All commercial artists keep files of clippings from various publications which may help them to draw or to give them new ideas. Action poses are particularly sought for among such publications. My block model can save much time and study in the analysis of various clippings and by supplementing them with original action poses. Again, the analysis of subtle lights and shadows on a living model can be aided by means of the more sharply defined lighting effects observable on various sides of the blocks of the posed model.

I claim:

1. A poseable, skeletonoid block model of the character described, for use as an aid to art practice and instruction in visual perspective, which comprises a plurality of blocks, each block being a unitary structure and representing a subdivision of a human skeleton, and means for nondetachably articulating said blocks to form said model and to permit the model to be posed in a plurality of attitudes; each of the blocks, representing the skull, the bony thorax, the pelvis, the humerus, the femur, the paired bones of the forearm and the paired bones of the leg, being bounded externally entirely by rectangular plane surfaces disposed in substantially parallel pairs.

2. A poseable, skeletonoid block model of the character described, for use as an aid to art practice and instruction in visual perspective, which comprises a plurality of blocks, each block being a unitary structure and representing a subdivision of a human skeleton, and means for nondetachably articulating said blocks to form said model and to permit the model to be posed in a plurality of attitudes; all of the blocks, except those representing the hands and feet, being bounded externally entirely by rectangular plane surfaces disposed in parallel pairs; each of the hand blocks having the form of a frustum of an ellipsoid, indented on a lateral, curved aspect thereof to outline the thumb; and each of the blocks representing a foot being bounded laterally by two parallel trapezoidal planes and otherwise by rectangular plane surfaces.

3. A poseable, skeletonoid block model of the character described, for use as an aid to art practice and instruction in visual perspective, which comprises a plurality of blocks, each block being a unitary structure and representing a subdivision of a human skeleton, and means for nondetachably articulating said blocks to form said model and to permit the model to be posed in a plurality of attitudes; each of the blocks, representing the skull, the bony thorax and the pelvis, being bounded externally entirely by rectangular plane surfaces disposed in substantially parallel pairs; the dimensions of the skull, of the thorax and of the pelvis, in fractions of the height of said block model, being as follows:

Skull—vertical height at front, one-eighth; vertical height at the back, lateral, and front-to-back dimensions, each one-twelfth;

Thorax—height and width, each one-sixth; front-to-back dimension, one-twelfth;

Pelvis—height and front-to-back dimension, each one-twelfth; width, one-sixth.

4. Apparatus for use as an aid to art practice and instruction in visual perspective, which comprises, in combination, a block model of the character defined in claim 3, and supporting means therefor; said supporting means comprising a tray, of the character described, positioned above said model and connected therewith by one or more strings, whereby the model is made to depend from said tray in a posed attitude.

5. Apparatus for use as an aid to art practice and instruction in visual perspective, which comprises, in combination, a block model of the character defined in claim 1, and supporting means therefor; said supporting means comprising a perforated tray, of the character and adapted for the uses set forth; said tray, when in use as said supporting means, being positioned above said model, and being connected therewith by one or more strings; one part of each string being affixed to the model, while another part of the string is passed through a perforation in the tray, and is held by the tray in such a manner as to allow the model to depend therefrom in a posed attitude.

KATHRYN B. TWOMEY.

REFERENCES CITED

The following references are of record in the file of this patent:

UNITED STATES PATENTS

| Number | Name | Date |
|---|---|---|
| 73,358 | McCeney | Jan. 14, 1868 |
| 239,834 | Paldi | Apr. 5, 1881 |
| 809,726 | Nelson | Jan. 9, 1906 |
| 1,055,516 | Carter | Mar. 11, 1913 |
| 1,478,058 | Pope | Dec. 18, 1923 |
| 1,494,872 | Weber | May 20, 1924 |
| 1,689,422 | Burton | Oct. 30, 1928 |
| 1,840,507 | Hanks | Jan. 12, 1932 |
| 1,882,575 | Hanks | Oct. 11, 1932 |
| 2,089,376 | Jacobson | Aug. 10, 1937 |
| 2,118,092 | Loeffel | May 24, 1938 |
| 2,169,682 | Duncan | Aug. 15, 1939 |
| 2,271,312 | Shorter | Jan. 27, 1942 |

FOREIGN PATENTS

| Number | Country | Date |
|---|---|---|
| 104,693 | Austria | 1926 |
| 567,224 | Germany | 1932 |

OTHER REFERENCES

Life, October 23, 1944, pages 45 and 46.